(12) United States Patent
Koppers et al.

(10) Patent No.: US 6,710,118 B2
(45) Date of Patent: Mar. 23, 2004

(54) AQUEOUS POLYMER DISPERSION AND ITS USE AS A WATER-VAPOR BARRIER

(75) Inventors: Markus Koppers, Maxdorf (DE); Marco Schmidt, Mannheim (DE); Thomas Anselmann, Landau (DE); Jürgen Schmidt-Thümmes, Neuhofen (DE); Mike Zott, Wachenheim (DE); Eckehardt Wistuba, Bad Duerkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/288,528

(22) Filed: Nov. 6, 2002

(65) Prior Publication Data

US 2003/0139522 A1 Jul. 24, 2003

(30) Foreign Application Priority Data

Nov. 30, 2001 (DE) .......................... 101 58 652

(51) Int. Cl.$^7$ ............................... C08F 36/06
(52) U.S. Cl. ................. 524/552; 524/560; 524/555; 524/562; 524/577; 428/510; 428/514; 428/521; 428/522
(58) Field of Search ............... 524/552, 560, 524/555, 562, 577; 428/510, 514, 521, 522

(56) References Cited

U.S. PATENT DOCUMENTS 2,689,235 A     9/1954  Henson et al.

6,258,890 B1 *  7/2001  Schmidt-Thuemmes et al. . 524/555

FOREIGN PATENT DOCUMENTS

| DE | 40 29 733 | 3/1992 |
| EP | 0 039 896 | 11/1981 |
| EP | 0 773 245 | 5/1997 |

* cited by examiner

*Primary Examiner*—David W. Wu
*Assistant Examiner*—Satya Sastri
(74) *Attorney, Agent, or Firm*—Oblon, Spivak, McClelland, Maier & Neustadt, P.C.

(57) ABSTRACT

An aqueous polymer dispersion whose polymer, present in disperse distribution, is composed in free-radically polymerized form of from 20 to 65% by weight of at least one vinylaromatic monomer (monomers A), from 30 to 75% by weight of at least one monomer having two conjugated, ethylenically unsaturated double bonds (monomers B), and from 0.5 to 10% by weight of at least one other monomer, C, selected from the group consisting of $\alpha,\beta$-monoethyienically unsaturated mono- and dicarboxylic acids and amide or ester derivatives thereof and whose alkali metal ion content GA, based on the mass of the dispersed polymer, is $\geq 0.5\%$ by weight, the pH of the aqueous dispersion medium being adjusted to a value below 6.

20 Claims, No Drawings

AQUEOUS POLYMER DISPERSION AND ITS USE AS A WATER-VAPOR BARRIER

BACKGROUND OF THE INVENTION

Field Of The Invention

The present invention relates to an aqueous polymer dispersion whose polymer, present in disperse distribution, is composed in free-radically polymerized form of from 20 to 65% by weight of at least one vinylaromatic monomer (monomers A), from 30 to 75% by weight of at least one monomer having two conjugated, ethylenically unsaturated double bonds (monomers B), and from 0.5 to 10% by weight of at least one other monomer, C, selected from the group consisting of $\alpha,\beta$-monoethylenically unsaturated mono- and dicarboxylic acids and amide or ester derivatives thereof and whose alkali metal ion content GA, based on the mass of the dispersed polymer, is $\geq 0.5\%$ by weight, the pH of the aqueous dispersion medium being adjusted to a value below 6.

Description Of The Background

The present invention further relates to the use of the aqueous polymer dispersion as a water-vapor barrier, and also for coating substrates or the walls of damp rooms and refrigeration rooms. The present invention additionally extends to a process for preparing the aqueous polymer dispersion and also to aqueous polymer formulations comprising the aqueous polymer dispersions.

Air normally contains a certain amount of water vapor which exerts a defined partial pressure. This water vapor uptake by the air is limited and depends on the temperature. As the temperature rises, there is a great increase in the water vapor uptake capacity. At the maximum amount of vapor, the partial pressure is equal to the saturation pressure of water at the same temperature. The percentage ratio of the amount of vapor present in the air to the maximum possible amount is termed relative atmospheric humidity. Given a constant absolute moisture content, the relative atmospheric humidity falls as the temperature rises and, conversely, rises on cooling. On going below the dew point temperature the amount of vapor present in excess of the saturation level condenses to form dew.

Where, for example, a porous wall separates two areas having different partial pressures of air and water vapor, then molecules of water vapor or, respectively, air pass through this wall until the concentrations or pressures are equal. If the wall at the same time has a temperature gradient along its thickness, the saturation pressure of water may be exceeded within the wall and there may as a result be formation of dew which damages the wall (eg. reduction in its thermal insulating effect, development of molds, etc.). Against this background it is desirable, for example, to make the interior walls of damp rooms (the term damp rooms as used herein refers to rooms whose atmosphere has an increased water-vapor content relative to the atmosphere of their surroundings; examples of damp rooms are kitchens, bathrooms, dairy rooms, industrial rooms, cellar rooms) as impermeable as possible to water vapor, ie. to provide them with a water-vapor barrier. Similar comments apply to the exterior walls of rooms whose surrounding atmosphere has a relatively increased water-vapor content (eg. the exterior walls of refrigeration rooms). A further area of application for water-vapor barriers is constituted by wood coatings. Owing to its hygroscopic nature, wood shrinks or swells in accordance with changing relative atmospheric humidity, as a consequence of the uptake or release of water to which this change in humidity gives rise; the wood warps, which is generally accompanied by damage to the coating on the wood. It is therefore desirable either to give the wood surface a water-vapor impermeable finish before applying the actual protective coating, or to make the wood coating itself impermeable to water vapor.

From Römpps Chemie-Lexikon, eighth edition, 1981, Cm-G, Franck Verlag, Stuttgart p. 974 it is known that the aqueous Diofan® polymer dispersions of BASF AG are able to form films having high impermeability to water vapor. Accordingly, films of Diofan A 601 and of Diofan A 690 are very suitable as water-vapor barriers both for typical wall surface materials, such as cement slurry coats, concrete, plaster, plasterboard, wood particleboard or chipboard, plywood, hardboard and masonry, and for wood itself.

In this context the water-vapor barrier effect can be obtained in a simple manner by coating the respective surface either with the aqueous polymer dispersion itself or with an appropriate composition containing the aqueous polymer dispersion as binder. When the coating dries, the polymer film exerting the barrier effect is formed.

The abovementioned Diofan grades are able to form films of enhanced elasticity even at the most common application temperatures (from 5 to 35° C.). This is important insofar as the substrates which are to be given a water-vapor impermeable finish generally have cracks whose expansion is subject to fluctuations in the case of temperature change. Owing to their enhanced elasticity, the Diofan films are able to follow these fluctuations in an advantageous manner without themselves cracking (crack sites open up the passage of water vapor) and thus to form a long-term barrier to water vapor.

A notable feature is that the Diofans are able to transfer the abovementioned profile of properties even to coating compositions which in addition to the Diofan comprise up to 60% of their overall volume solids content of added, finely divided mineral materials, such as fillers and pigments (while fillers and pigments are normally distinguished from one another on the basis of their different degrees of fine division and of their different refractive index, the term pigment as used herein should be interpreted here as including both; correspondingly, the volume proportion mentioned above forms the pigment volume concentration (PVC)). This opens up the possibility of giving the water-vapor barriers visual appeal and of producing them, in a simple manner, with variable coat thicknesses.

The Diofan films also have an outstanding capacity for adhering to the materials mentioned as possibilities for wall surfaces.

A disadvantage of the Diofans, however, is that the vinylidene chloride which they contain in polymerized form is subject to progressive hydrolysis over time under the action of the aqueous dispersion medium, in the course of which hydrolysis hydrogen chloride is formed. The latter is an unwanted contaminant and has an adverse effect, inter alia, on the stability on storage and the thickening and formulation properties of corresponding coating formulations (for example, finely divided $CaCO_3$ pigment is attacked by the evolution of hydrogen chloride).

EP-A 773245 discloses aqueous polymer dispersions which are highly suitable, inter alia, as water-vapor barriers for sealing walls in damp rooms. That laid-open specification maintains that the alkali metal content (GA) should be $\leq 0.5\%$ by weight, based on the mass of the dispersed polymer. According to the teaching of EP-A 773 245, the effect of the polymer dispersion as a water-vapor barrier would be lost at higher alkali metal ion contents. In order to stabilize the polymer dispersion adequately for its use as a water-vapor barrier, its pH is raised to more than 6. In accordance with EP-A 773 245 this is done by using ammonia as the neutralizing agent instead of metal hydroxides. In certain applications, however, especially in enclosed spaces, this leads to odor nuisance when the polymer dispersion is applied to the substrate.

SUMMARY OF THE INVENTION

It is an object of the present invention to remedy the disadvantages depicted and to provide an aqueous polymer dispersion for use for producing water-vapor barriers which can be applied to the substrate in particular without odor nuisance and which at the same time has the advantageous profile of properties of the Diofans.

We have found that this object is achieved in that aqueous polymer dispersions whose polymer, present in disperse distribution, is composed in free-radically polymerized form of from 20 to 65% by weight of at least one vinylaromatic monomer (monomers A), from 30 to 75% by weight of at least one monomer having two conjugated, ethylenically unsaturated double bonds (monomers B), and from 0.5 to 10% by weight of at least one other monomer, C, selected from the group consisting of α,β-monoethylenically unsaturated mono- and dicarboxylic acids and amide or ester derivatives thereof and whose alkali metal ion content GA, based on the mass of the dispersed polymer, is $\geq 0.5\%$ by weight, the pH of the aqueous dispersion medium being adjusted to a value below 6 are highly suitable in the manner required for producing water-vapor barriers. A further improvement in the ability to exhibit good water-vapor barrier properties is possible by reducing the pH further, in which case the concentration of alkali metal ions also falls accordingly.

DETAILED DESCRIPTION OF THE PREFERRED EMBODIMENTS

Monomers A suitable in accordance with the invention include styrene and also vinyltoluenes, an example being α-methylstyrene. It is, however, also possible to use other vinylaromatic monomers, including divinylbenzene, as monomers A. Styrene is preferably employed.

Monomers suitable as monomer B are those which have two conjugated, ethylenically unsaturated double bonds, examples being butadiene, 2-methylbutadiene (isoprene) and 2,3-dimethylbutadiene.

The polymer of the polymer dispersion of the invention contains as monomer C a monomer selected from the group consisting of α,β-monoethylenically unsaturated mono- and dicarboxylic acids and their amide or ester derivatives. As monomers C it is possible, inter alia, to employ vinyl esters of alkanecarboxylic acids having 1 to 3 carbon atoms, esters of acrylic or of methacrylic acid with alcohols containing 1 to 8 carbon atoms, and also α,β-monoethylenically unsaturated mono- and dicarboxylic acids having 3 to 6 carbon atoms, and also their amide or ester derivatives.

Particularly suitable monomers C include vinyl formate, Versatic acids and Versatates, vinyl acetate, vinyl propionate, acrylic acid, methacrylic acid, maleic acid, itaconic acid, acrylamide, methacrylamide, methyl acrylate, methyl methacrylate, ethyl acrylate, ethyl methacrylate, n-butyl acrylate, n-butyl methacrylate, tert-butyl acrylate, tert-butyl methacrylate, isobutyl acrylate, isobutyl methacrylate, 2-ethylhexyl acrylate, 2-ethylhexyl methacrylate, hydroxyethyl acrylate, hydroxyethyl methacrylate, hydroxypropyl acrylate, hydroxypropyl methacrylate, hydroxybutyl acrylate and hydroxybutyl methacrylate. Particular preference is given, inter alia, to itaconic acid and to the Versatic acids.

The aqueous polymer dispersions for use in accordance with the invention embrace embodiments whose polymer, present in disperse distribution, is composed of from 20 to 65% by weight of monomers A, from 30 to 75% by weight of monomers B and from 0.5 to 10% by weight of monomers C. Particularly preferred aqueous polymer dispersions comprise a polymer composed of from 45 to 60% by weight of monomer A, from 35 to 50% by weight of monomer B and from 0.5 to 10% by weight of monomer C. The fraction of the monomer C in the polymer is in particular from 0.5 to 5% by weight, more particularly from 0.7 to 3% by weight.

The z-mean polymer particle diameter $\overline{d}_z$ of the aqueous polymer dispersions to be employed in accordance with the invention is in general from $\geq 100$ nm to $\leq 250$ nm, frequently also from $\geq 140$ nm to $\leq 200$ nm, and can be determined by the method of quasielastic light scattering. The pH of the aqueous dispersion medium (at 25° C. and 1 atm) of the aqueous polymer dispersions to be used in accordance with the invention is preferably $\leq 6$ (glass electrode). The favorable pH range is from more than 4 to less than 6, in particular from 4.5 to less than 6. Particular preference is given to a pH between 5 and 6. The desired pH of the aqueous dispersion medium is adjusted by way of the concentration of the corresponding alkali metal hydroxides.

It is also essential to the invention that the alkali metal ion content of the aqueous polymer dispersions that are to be used, based on the mass of the dispersed polymer, is $\geq 0.5\%$ by weight. Particularly preferred aqueous polymer dispersions have an alkali metal ion content GA, based on the mass of the dispersed polymer, of from $\geq 0.5$ to $\leq 0.7\%$ by weight. Particularly suitable alkali metal ions include sodium ions or else potassium ions, which are used in the form of their hydroxides. It is, however, also possible to use calcium ions as well.

Through the combination of the adjustment of the alkali metal ion content GA, based on the mass of the dispersed polymer, to $\geq 0.5\%$ by weight and of the pH of the aqueous dispersion medium to a value below 6, it is possible to provide aqueous polymer dispersions which may be employed, inter alia, in the production of water-vapor barriers without odor nuisance.

The aqueous polymer dispersions to be used in accordance with the invention can be prepared from their starting monomers A–C in a manner known per se by the method of free-radical aqueous emulsion polymerization, ie. with the addition of free-radical polymerization initiator, dispersant and, if desired, molecular weight regulators. The most simple procedure here is to charge all starting substances with stirring to the polymerization vessel and then to set the desired polymerization temperature. The composition of the polymerization batch, especially of the monomers A–C, is advantageously chosen so that the glass transition temperature Tg of the film of the resulting aqueous polymer dispersion (determined by means of differential scanning calorimetry, 20° C./min., midpoint) is from −30 to +15° C., frequently from −10 to +5° C. The connection between glass transition temperature and monomer composition is known to the skilled worker for random copolymers, and for copolymer molecular weights of more than 50,000 relative molecular weight units, in good approximation by the Fox equation.

According to Fox (T. G. Fox, Bull. Am. Phys. Soc. (Ser. II) 1, 123 [1956] and Ullmanns Encyclopädie der technischen Chemie, 4th edition, Vol. 19, 1980, VCH Chemie, p. 18 it is true in good approximation, for the glass transition temperature of copolymers, that:

$$\frac{1}{T_g} = \frac{X^1}{T_g^1} + \frac{X^2}{T_g^2} + \ldots \frac{X^n}{T_g^n},$$

where $X^1, X^2, \ldots, X^n$ are the mass fractions of the monomers 1, 2, ..., n and $T_g^1, T_g^2, T_g^n$ are the glass transition temperatures of the homopolymers of each of the monomers 1, 2, ..., n, in degrees Kelvin. The glass transition temperatures of these homopolymers of the above-mentioned monomers are known and are listed, for example, in J. Brandrup, E. H. Immergut, Polymer Handbook 1$^{st}$ Ed., J. Wiley, New York 1966, 2$^{nd}$ Ed., J. Wiley, New York 1975, and 3$^{rd}$ Ed., J. Wiley, New York, 1989 and Ullmann's Encyclopedia of Industrial Chemistry, VCH Chemie, Vol. A 21, 1992, p. 169, Table 8.

Suitable free-radical polymerization initiators for the aqueous free-radical emulsion polymerization are, in particular, those which are soluble in the aqueous medium in the required amount. These initiators may be peroxides, peroxodisulfuric acid and its salts, or azo compounds. The polymerization temperature is normally adapted to the initiator system used and can be from 0 to 130° C. When peroxodisulfuric acid or its salts are used, it is generally from 70 to 130° C., preferably from 75 to 100° C. The operating pressure in the aqueous free-radical emulsion polymerization can be adapted to the polymerization temperature and to the volatility of the monomers to be polymerized, and can be from 1 to 10 atm or more. Low polymerization temperatures are made possible by combined initiator systems composed of at least one reducing agent and at least one peroxide and/or hydroperoxide, eg. tert-butyl hydroperoxide and hydroxymethanesulfinic acid or its salts, or hydrogen peroxide and ascorbic acid. Particularly low polymerization temperatures are made possible by the use of combined initiator systems which, moreover, contain a small amount of a metal compound which is soluble in the polymerization medium and whose metallic component is able to exist in a plurality of valence states. An example which may be mentioned is the combination ascorbic acid/iron(II) sulfate/hydrogen peroxide. The amount of free-radical polymerization initiator used is generally, based on the overall quantity of monomers to be polymerized, from 0.1 to 3% by weight, preference being given to the use of peroxodisulfuric acid and its salts.

To ensure the stability of the resulting aqueous polymer dispersion, it is common in the case of free-radical aqueous emulsion polymerization to use dispersants as well. Suitable as dispersants are all those customarily employed, ie. both protective colloids and emulsifiers. Examples of suitable protective colloids are polyvinyl alcohols, cellulose derivatives or vinylpyrrolidone-containing copolymers. A detailed description of further suitable protective colloids is found in Houben-Weyl, Methoden der organischen Chemie, Volume XIV/1, Makromolekulare Stoffe [Macromolecular substances], Georg-Thieme-Verlag, Stuttgart, 1961, pp. 411 to 420. It is of course also possible to use mixtures of emulsifiers and/or protective colloids. As dispersants it is preferred to employ exclusively emulsifiers, whose relative molecular weights, unlike the protective colloids, are usually below 1000. Another difference between these emulsifiers and the protective colloids is that the former are capable of forming micelles in water above the critical micelle-forming concentration.

Emulsifiers used may be anionic, cationic or nonionic in nature. Of course, where mixtures of surface-active substances are used, the individual components must be compatible with one another, and this can be checked in cases of doubt through a few preliminary experiments. In general, anionic emulsifiers are compatible with one another and with nonionic emulsifiers. Where anionic emulsifiers are employed, their counterion is preferably a sodium ion. Examples of customary emulsifiers are ethoxylated mono-, di- and trialkylphenols (EO degree: 3 to 50, alkyl radical: $C_4$ to $C_9$), ethoxylated fatty alcohols (EO degree: 3 to 50, alkyl radical: $C_8$ to $C_{36}$), and alkali metal and ammonium salts of alkyl sulfates (alkyl radical: $C_8$ to $C_{12}$), of sulfuric acid monoesters of ethoxylated alkanols (EO degree: 2 to 30, alkyl radical: $C_{10}$ to $C_{18}$) and of ethoxylated alkylphenols (EO degree: 3 to 50, alkyl radical: $C_4$ to $C_9$), of alkylsulfonic acids (alkyl radical: $C_{12}$ to $C_{18}$) and of alkylarylsulfonic acids (alkyl radical: $C_9$ to $C_{18}$). Mention may be made, by way of example, of the alkali metal and/or ammonium salts of dodecylbenzenesulfonic acid and of the alkali metal and/or ammonium salts of the sulfuric acid monoester of ethoxylated dodecanol (EO degree: 2 to 4). Further suitable emulsifiers can be found in the abovementioned Houben-Weyl volume, pp. 192–208.

Other surface-active substances which have been found suitable are compounds of the general formula I

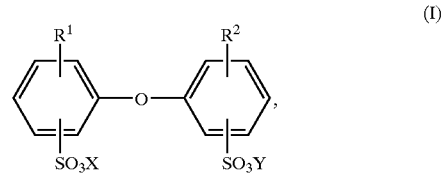

where $R^1$ and $R^2$ are hydrogen or $C_4$–$C_{24}$-alkyl and are not simultaneously hydrogen, and X and Y can be alkali metal and/or ammonium ions. In formula I $R^1$ and $R^2$ are preferably linear or branched alkyls of 6 to 18 carbon atoms or hydrogen, and especially of 6, 12 and 16 carbon atoms, and again are not both simultaneously hydrogen. X and Y are preferably sodium, potassium or ammonium ions, particularly preferably sodium. Individual mention may be made of compounds I where X and Y are sodium or ammonium, $R^1$ is branched alkyl of 12 carbons and $R^2$ is hydrogen or $R^1$. Use is frequently made of technical-grade mixtures comprising a proportion of from 50 to 90% by weight of the monoalkylated product, an example being Dowfax® 2 A1 (trademark of Dow Chemical Company).

In general, the quantity of dispersant employed is from 1 to 3% by weight, based on the monomers to be free-radically polymerized. It is of advantage in accordance with the invention that in general ≦2% by weight, or ≦1.5 or ≦1% by weight of dispersant (related correspondingly as above) are sufficient for the preparation even of the aqueous polymer dispersions which are to be used with the greatest preference.

In order to control the molecular weight of the resulting polymer, polymerization is normally carried out in the presence of molecular weight regulators such as mercaptans, for example n-dodecyl mercaptan or tert-dodecyl mercaptan. The quantity of molecular weight regulator used, based on the quantity of monomers to be polymerized, is typically from 0.1 to 5% by weight, usually not more than 2.5% by weight.

Polymerization is carried out in general under an inert gas atmosphere. On the industrial scale, free-radical aqueous emulsion polymerizations are usually carried out in iron or steel vessels. In order to rule out the adverse effects of very small traces of iron dissolving in the course of the polymerization, it is normal to add chelating agents capable of complexing iron ions to the polymerization mixture. A typical representative of such agents is Trilon® B (the disodium salt of ethylenediaminetetraacetic acid). Quantities below 1% by weight are generally sufficient for the use of chelating agents, relative to the monomers to be polymerized.

For reliable dissipation of the heat of reaction, the industrial implementation of free-radical aqueous emulsion polymerization for the preparation of the aqueous polymer dispersions to be used in accordance with the invention is expediently carried out by the monomer feed method. In other words, only part of the polymerization batch is included in the initial charge to the polymerization vessel, and, in particular, the predominant amount of the monomers to be polymerized is supplied continuously to the polymerization vessel in proportion with their consumption. Preferably, the monomers are supplied as a pre-emulsion in the aqueous medium. In general, the continuous supply of monomers is accompanied by a synchronous supply of initiator. In order to improve the reproducibility of the mean polymer particle size, the initial charge judiciously comprises a small quantity of a very fine preformed aqueous polymer dispersion (a seed latex). Typically, the number-average polymer particle diameter $\bar{d}_n$ of the substantially monodisperse seed latex is 30 nm. It is additionally advantageous if the seed latex is a polystyrene seed. For reasons of increased stability of the disperse distribution of the seed latex particles, the initial charge generally comprises, when α,β-monoethylenically unsaturated carboxylic acids are to be copolymerized, a part thereof. The chelating agent is also normally part of the initial charge. If molecular weight regulators are used, they are generally a constituent of the monomer feed stream.

In order to remove volatile organic constituents from the resulting aqueous polymer dispersion, the latter is frequently subjected, following the actual polymerization process, to both chemical and physical deodorizing treatment. In the case of chemical deodorizing, a specific polymerization initiator (for example the system comprising tert-butyl hydroperoxide/sodium disulfite/acetone) is added to the aqueous polymer dispersion, and provides for particularly effective initiation of polymerization of monomers which have not been incorporated by polymerization under the actual polymerization conditions (residual monomers), as a result of which they are bound chemically into the polymer chains. After chemical deodorizing, noncopolymerizable volatile organic constituents are usually eliminated further by stripping with steam (physical deodorizing). In this way it is possible to obtain aqueous polymer dispersions to be used in accordance with the invention whose residual content of volatile organic compounds is <100 ppm (based on the mass of the aqueous polymer dispersion). In most cases the aqueous polymer dispersions to be used in accordance with the invention are prepared with a solids content of from 40 to 70, preferably from 50 to 60, % by weight.

In accordance with the invention it is favorable for the films of the aqueous polymer dispersions to be used in accordance with the invention to have not only an enhanced barrier effect relative to water vapor but also an enhanced repellency to water in the liquid state of aggregation. This ensures permanent adhesion even in the case of wetting from behind, and prevents the formation of blisters and cracks. Accordingly, the aqueous polymer dispersions to be used in accordance with the invention are also suitable as binders for sealing compounds. With particular advantage they are used around installations in walls to seal such joints against both water vapor and condensation. In this case a primer coating is generally applied first of all, into which a woven fabric (for example a woven glass fiber mat) is often placed. After this, a final coating is applied.

As already mentioned, the aqueous polymer dispersions to be used in accordance with the invention can be applied by themselves as a water-vapor barrier coating (primer or topcoat). In most cases, however, they are used with the addition of finely divided inorganic pigments as aqueous polymer formulations. In this respect it is advantageous that the aqueous polymer dispersions to be used in accordance with the invention also have an enhanced pigment binding capacity. Typical pigment volume concentrations, in % by volume, are up to 60, generally from 10 to 60, frequently from 10 to 55 and usually from 20 to 45. The pigmented systems are also particularly suitable as sealing compounds.

Suitable finely divided inorganic pigments include mica, kaolin, heavy spar, talc, quartz sand, quartz flour, chalk, titanium dioxide, dolomite, ground barytes, hydrophobized, finely divided silica, iron oxide and other color pigments. If desired it is also possible to use organic pigments for coloring purposes. The maximum particle diameter of such pigments is generally from 1 to 100 μm. Since the inorganic pigments are generally substantially insoluble in the aqueous medium, it is possible in this way to obtain aqueous polymer formulations, to be used in accordance with the invention, whose content of alkali metal ions dissolved in the aqueous medium, based on the mass of the dispersed polymer present, is ≦0.5, preferably from ≧0.5 to ≦0.7% by weight.

In addition to pigments, the novel aqueous polymer formulations to be applied as water-vapor barriers usually also comprise defoamers, thickeners, pigment-dispersing agents and preservatives. In general the overall quantity of these auxiliaries, including the dispersants of the aqueous polymer base dipsersion, is ≦10% by weight, preferably ≦5% by weight, based on the overall mass of the aqueous formulation. Preferably, these auxiliaries also contain no water-soluble alkali metal ions or water-soluble metal ions at all. The novel water-vapor barriers are typically applied in dry-film thicknesses of up to 2 mm or more if desired. Finally, it is found that the novel water-vapor barriers also show long-term effectiveness on alkaline substrates, with the result that it is possible, for example, to avoid or reduce hydrolysis reactions of subsequently applied adhesives.

In general, the water-vapor diffusion resistance index $S_d/S$ of the novel water-vapor barriers is ≧10,000. At the same time, elongations at break of ≧200% and a tensile strength ≧1.5 N/mm² are possible (based on water-vapor barriers stored under dry conditions).

The aqueous polymer dispersions of the invention, and the aqueous polymer formulations which are likewise of the invention, are suitable, inter alia, as or for producing a water-vapor barrier, and also for coating substrates and additionally for coating the walls of damp rooms or refrigeration rooms. Suitable substrates are for example concrete, plaster, plasterboard, wood particleboard, plywood, fiberboard, wood, cement mortar, masonry or cement.

In conclusion, other possible uses of the novel aqueous polymer dispersions or formulations may be noted: use as primer (especially on mineral substrates such as cement mortar or plasterboard), use as crown cork sealant (can sealant), use as additive for modifying cement mortar, use for coating concrete to protect it against drying out during setting, and use as binder for anticorrosion coatings (protection against water).

EXAMPLES

A. Preparation of the Aqueous Polymer Dispersion ED for Use in Accordance with the Invention Example 1

A 160 l steel reactor equipped with an anchor stirrer was charged with

| | |
|---|---|
| 30.89 kg | DI water |
| 6.18 kg | itaconic acid (7% by weight) |
| 2.6 kg | styrene seed |
| 0.17 kg | ethylenediaminetetraacetate (EDTA: 2% by weight) |

| | |
|---|---|
| 4.83 kg | feed stream 1 |
| 1.14 kg | feed stream 2. |

The initial charge was flushed once with nitrogen and heated with stirring to the polymerization temperature of 90° C., which was maintained during the polymerization. When the internal temperature of the reactor reached 80° C., the addition of the monomer feed stream (feed stream 1) was commenced. This feed stream was metered continuously into the polymerization reactor over the course of 5 h. Beginning synchronously with feed stream 1, the initiator (feed stream 2) was run in over the course of 5.5 h.

| Feed stream 1: | |
|---|---|
| 17.21 kg | DI water |
| 4.45 kg | sulfated fatty alcohol ethoxylate (28% by weight) Na salt |
| 12.36 kg | itaconic acid (7% by weight) or acrylic acid |
| 1.64 kg | t-dodecyl mercaptan |
| 46.93 kg | styrene |
| 38.28 kg | butadiene |
| Feed stream 2: | |
| 4.6 kg | DI water |
| 0.35 kg | sodium persulfate |

After the end of feed stream 2, the polymer mixture was held at 90° C. with stirring for 2 h more. It was then cooled to 80° C. and this temperature was maintained while a solution 3 and 4 were metered synchronously and continuously into the reactor over the course of 2 h.

| Feed stream 3: | |
|---|---|
| 2.45 kg | DI water |
| 0.41 kg | tert-butyl hydroperoxide (t-BHP) (70% by weight) |
| Feed stream 4: | |
| 3 kg | water |
| 0.18 kg | acetone |
| 0.71 kg | sodium disulfite |

The pH of the aqueous medium was then raised by adding approximately 10% strength aqueous sodium hydroxide solution (feed stream 5) and the reaction mixture was then physically deodorized by passing steam through it.

| Feed stream 5: | |
|---|---|
| 1.99 kg | DI water |
| 1.59 kg | sodium hydroxide, 25% |

This gave a polymer dispersion for use in accordance with the invention whose solids content was approximately 52 percent by weight and whose residual VOC (volatile organic components) content was below 100 ppm. The dispersed polymer had the following monomer composition:

| | |
|---|---|
| 54.25% by weight | styrene |
| 44.25% by weight | butadiene |
| 1.5% by weight | itaconic acid |

The glass transition temperature of its film was −3° C.

Example 2

Like example 1 but with a higher NaOH content.

| | |
|---|---|
| 13.49 kg | DI water |
| 0.002 kg | ethylenediaminetetraacetate (EDTA; 2% by weight) |
| 5 kg | itaconic acid (7% by weight) |
| 1.5 kg | styrene seed (33% by weight) |
| 2.82 kg | feed stream 1 |
| 1.43 kg | feed stream 2 |

The initial charge was flushed once with nitrogen and heated with stirring to the polymerization temperature of 90° C., which was maintained during the polymerization. When the internal temperature of the reactor reached 80° C., the addition of the monomer feed stream (feed stream 1) was commenced. This feed stream was metered continuously into the polymerization reactor over the course of 5 h. Beginning synchronously with feed stream 1, the initiator (feed stream 2) was run in over the course of 5.5 h.

| Feed stream 1: | |
|---|---|
| 7.6 kg | DI water |
| 2.571 kg | sulfated fatty alcohol ethoxylate (28% by weight) Na salt |
| 10 kg | itaconic acid (7% by weight) (acrylic acid) |
| 0.95 kg | t-dodecyl mercaptan |
| 27.12 kg | styrene |
| 22.12 kg | butadiene |
| Feed stream 2: | |
| 5.52 kg | DI water |
| 0.2 kg | sodium persulfate |

After the end of feed stream 2, the polymer mixture was held at 90° C. with stirring for 2 h more. It was then cooled to 80° C. and this temperature was maintained while a solution 3 and 4 were metered synchronously and continuously into the reactor over the course of 2 h.

| Feed stream 3: | |
|---|---|
| 1.41 kg | DI water |
| 0.24 kg | tert-butyl hydroperoxide (t-BHP) (70% by weight) |
| Feed stream 4: | |
| 1.73 kg | water |
| 0.11 kg | acetone |
| 0.41 kg | sodium disulfite |

The pH of the aqueous medium was then raised by adding an approximately 10% strength aqueous sodium hydroxide solution (feed stream 5) and the reaction mixture was then physically deodorized by passing steam through it.

| Feed stream 5: | |
|---|---|
| 1.5 kg | DI water |
| 1.0 kg | sodium hydroxide, 25% |

This gave a polymer dispersion for use in accordance with the invention whose solids content was approximately 51% by weight and whose residual VOC (volatile organic components) content was below 100 ppm. The dispersed polymer had the following monomer composition:

| 54.25% by weight | styrene |
|---|---|
| 42.25% by weight | butadiene |
| 1.5% by weight | itaconic acid |

The glass transition temperature of its film was −3° C.

Example 3

As in example 1, but following its preparation the dispersion was enriched with Na ions by adding 1.84 kg of a 28% strength by weight solution of the Na salt of a sulfonated fatty alcohol ethoxylate (feed stream 6)

Feed Stream 6:

2.84 kg sulfated fatty alcohol ethoxylate Na salt (28% by weight).

B. Preparation of the Comparative Polymer Dispersions CD

Comparative Example A

Like example 2 but feed stream 5 contained 2.25 kg of 25% NaOH.

Comparative Example B

Like example 2 but 0.3 kg of sodium persulfate was used in feed stream 2. Additionally, 0.4 kg of sodium hydroxide was removed from feed stream 5 and added to feed stream 1.

Comparative Example C

Like example 2 but 2.1 kg of styrene seed (instead of 1.5 kg) were used and feed stream 5 had the following composition:

| 1.95 kg | DI water |
|---|---|
| 1.3 kg | sodium hydroxide, 25% |

Composition of the polymer dispersions used:

TABLE I

| Sample | Composition | t-DMC | SC/% | AZ/nm |
|---|---|---|---|---|
| Example 1 | 1.5% IS, 54.25% S, 44.25% Bu, 1.44% sulfonated fatty alcohol ethoxylate Na salt | 1.4 | 55.5 | 149 |
| Example 2 | 1.5% IS, 54.25% S, 44.25% Bu, 1.44% sulfonated fatty alcohol ethoxylate Na salt | 1.9 | 50.3 | 151 |
| Example 3 | 1.5% IS, 54.25% S, 44.25% Bu, 2.36% sulfonated fatty alcohol ethoxylate Na salt | 2 | 52.3 | 150 |
| Comparative example A | 1.5% IS, 54.25% S, 44.25% Bu, 1.44% sulfonated fatty alcohol ethoxylate Na salt | 2 | 50 | 136 |
| Comparative example B | 1.5% IS, 54.25% S, 44.25% Bu, 1.44% sulfonated fatty alcohol ethoxylate Na salt | 1.4 | 50 | 145 |
| Comparative example C | 1.5% IS, 54.25% S, 44.25% Bu, 1.44% sulfonated fatty alcohol ethoxylate Na salt | 1.6 | 50.9 | 135 |

Abbreviations:

IS: itaconic acid

S: styrene

Bu: butadiene t-DMC: tert-dodecyl mercaptan

SC: solids content

AZ: z-average polymer particle diameter

Abbreviations:

IS: itaconic acid S: styrene Bu: butadiene t-DMC: tert-dodecyl mercaptan SC: solids content AZ: z-average polymer particle diameter C. Assembly of Aqueous Polymer Formulations from the Aqueous Polymer Dispersions ED and the Comparative Polymer Dispersion CD Formulation Recipe:

x parts by weight of dispersions (amount for each example given in table II)

y parts by weight of ethoxylated fatty alcohol containing 8 EO units (amount for each example given in table II)

12 parts by weight of Byk® 035 (defoamer from Byk-Chemie GmbH, Wesel, Del.)

10 parts by weight of Pigmentverteiler MD 20 (pigment-dispersing agent, sodium salt of a copolymer of maleic acid and diisobutylene in aqueous solution, from BASF AG)

5 parts by weight of Kronos® 2056 (finely divided $TiO_2$ (rutile) from Kronos Titan-GmbH, Leverkusen, Del.)

475 parts by weight of Omyacarb® 5 GU (calcium carbonate from Omya GmbH, Cologne)

6 parts by weight of Collacral® PU, 75.5% by weight (polyurethane-based associative thickener from BASF AG, Ludwigshafen, Del.).

The polymer dispersions ED and CD obtained in B. were each converted into polymer formulations.

The pigment volume concentration of the resulting formulations was approximately 40% by volume and their solids content was approximately 77% by weight.

D. Determination of the Water Absorption and Water Vapor Permeability (WVP) of the Formulations from C.

Table II

|  | Example 1 | Example 2 | Example 3 | Comp. ex. A | Comp. ex. B | Comp. ex. C |
|---|---|---|---|---|---|---|
| Parts by weight of ethoxylated fatty alcohol containing 8 EO units | 27 | 27 | 20.25 | 27 | 27 | 27 |
| Parts by weight of dispersion | 453 | 484 | 457 | 484 | 482 | 481 |
| pH | 5.5 | 5.9 | 5.8 | 6.7 | 6.1 | 7.0 |
| Water absorption in 48 h [wt. %] | 4.4 | 3.5 | 4.6 | 7 | 9.8 | 9.8 |
| Water absorption in 96 h [wt. %] | 6.7 | 5 | 6.6 | 13.3 | 13.4 | 12.9 |
| Water absorption in 24 h [wt. %] | 2 | 1.8 | 1.9 | 1.7 | 1.9 | 1.9 |
| WVP in $g/m^2 * d$ | 0.9 | 2.1 | 4.3 | 6.5 | 7.8 | 14.4 |
| Na content a) | 0.51 | 0.53 | 0.57 | 0.53 | 0.57 | 0.62 | a) based on the mass of the dispersed polymer (i.e., based on the monomers)

a) based on the mass of the dispersed polymer (i.e., based on the monomers)

The water vapor permeability WVP [$g/m^2$ day] is determined in accordance with DIN 52 615 (dry film thickness 0.6 mm) with a humidity gradient of 50% to 93% relative atmospheric humidity and at 23° C.;

the water absorption WA [% by weight] is determined after 24 h, 48 h and after 96 h; at 23° C.

The score for water absorption is favorable if the absorption figure after 48 hours is still below 5% by weight. This is achieved by the inventive examples 1 to 3 but not by the comparative examples A to C. The inventive examples 1 to 3 are also distinguished by much better figures for water vapor permeability than the comparative examples A to C.

We claim:

1. An aqueous polymer dispersion whose polymer, present in disperse distribution, is composed in free-radically polymerized form of
   from 20 to 65% by weight of at least one vinylaromatic monomer (monomers A),
   from 30 to 75% by weight of at least one monomer having two conjugated, ethylenically unsaturated double bonds (monomers B), and
   from 0.5 to 10% by weight of at least one other monomer, C, selected from the group consisting of α,β-monoethylenically unsaturated mono- and dicarboxylic acids and amide or ester derivatives thereof
and whose alkali metal ion content GA, based on the mass of the dispersed polymer, is ≧0.5% by weight, the pH of the aqueous dispersion medium being adjusted to a value below 6.

2. A dispersion as claimed in claim 1, wherein the monomers A comprise styrene and/or vinyltoluene.

3. A dispersion as claimed in claim 1, wherein styrene is the sole monomer A.

4. A dispersion as claimed in claim 1, wherein the monomers B consist of butadiene and/or isoprene.

5. A dispersion as claimed in claim 1, wherein butadiene is the sole monomer B.

6. A dispersion as claimed in claim 1, wherein monomer C selected from the group consisting of vinyl esters of alkanecarboxylic acids having 1 to 3 carbon atoms, esters of (meth)acrylic acid with alkanols having 1 to 8 carbon atoms, α,β-monoethylenically unsaturated mono- and dicarboxylic acids having 3 to 6 carbon atoms, and amides and esters of α,β-monoethylenically unsaturated mono- and dicarboxylic acids having 3 to 6 carbon atoms.

7. A dispersion as claimed in claim 6, wherein the monomers C are selected from the group consisting of vinyl formate, vinyl acetate, vinyl propionate, acrylic acid, methacrylic acid, maleic acid, itaconic acid, acrylamide, methacrylamide, methyl acrylate, methyl methacrylate, ethyl acrylate, ethyl methacrylate, n-butyl acrylate, n-butyl methacrylate, tert-butyl acrylate, tert-butyl methacrylate, isobutyl acrylate, isobutyl methacrylate, 2-ethylhexyl acrylate, 2-ethylhexyl methacrylate, hydroxyethyl acrylate, hydroxyethyl methacrylate, hydroxypropyl acrylate, hydroxypropyl methacrylate, hydroxybutyl acrylate and hydroxybutyl methacrylate.

8. A dispersion as claimed in claim 1, whose polymer, present in disperse distribution, is composed in free-radically polymerized form of from 45 to 60% by weight of monomers A, from 35 to 50% by weight of monomers B and from 0.5 to 10% by weight of monomers C.

9. A dispersion as claimed in claim 1, wherein the monomers C are selected from the group consisting of acrylic acid, methacrylic acid, itaconic acid, and the amide and ester derivatives thereof.

10. A dispersion as claimed in claim 1, whose z-mean polymer particle diameter is from ≧100 to ≦250 nm.

11. A dispersion as claimed in claim 1, whose aqueous dispersion medium has a pH of more than 4 and less than 6.

12. A dispersion as claimed in claim 1, wherein GA, based on the mass of the dispersed polymer, is from ≧0.5 to ≦0.7% by weight.

13. A dispersion as claimed in claim 1, whose dispersed polymer has a glass transition temperature ranging from −30 to +15° C.

14. A dispersion as claimed in claim 1, whose solids content ranges from 40 to 70% by weight.

15. An aqueous polymer formulation which comprises a dispersion as claimed in claim 1 and finely divided pigments in a pigment volume concentration of up to 60% by volume.

16. A water-vapor barrier comprising a dispersion as claimed in claim 1.

17. A water-vapor barrier comprising an aqueous polymer formulation as claimed in claim 15.

18. A coated substrate comprising a dispersion as claimed in claim 1.

19. A coated substrate comprising an aqueous polymer formulation as claimed in claim 15.

20. A process for preparing a dispersion as claimed in claim 1, comprising:

free-radically polymerizing, by aqueous emulsion polymerization, starting monomers A, B and C in the ratio corresponding to the desired monomer constituency of the polymer and;

adding a defined amount of an aqueous alkali metal hydroxide solution in order to adjust the pH of the aqueous dispersion medium to a value below 6.

* * * * *